US006381714B1

(12) United States Patent
Tomita et al.

(10) Patent No.: US 6,381,714 B1
(45) Date of Patent: Apr. 30, 2002

(54) ERROR DETECTION METHOD, ERROR DETECTION APPARATUS, AND NETWORK SYSTEM

(75) Inventors: Akiyoshi Tomita; Kazuyoshi Unno; Hiroshi Nishiyama; Akira Norizuki; Katsutoshi Nakajima; Yoshikazu Saito, all of Shizuoka-ken (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/350,888

(22) Filed: Jul. 12, 1999

(30) Foreign Application Priority Data

Jul. 30, 1998 (JP) .......................... P 10-215967

(51) Int. Cl.[7] .............................................. G01R 31/28
(52) U.S. Cl. ...................................... 714/712; 714/746
(58) Field of Search ............................... 714/2, 4, 746, 714/712; 370/242, 216, 222

(56) References Cited

U.S. PATENT DOCUMENTS 5,600,782 A * 2/1997 Thomson ..................... 714/4

FOREIGN PATENT DOCUMENTS

JP  4-160934  6/1992

OTHER PUBLICATIONS

Tran, E, Multi–Bit Error Vulnerabilities in the Controller Area Network Protocol, Carnegie Mellon University, May 1999.*

* cited by examiner

Primary Examiner—Albert DeCady
Assistant Examiner—Shelly A Chase
(74) Attorney, Agent, or Firm—Oblon, Spivak, McClelland, Maier & Neustadt, P.C.

(57) ABSTRACT

In a normal operation mode, paths in a communication IC are controlled so that data received from a transmission line and addressed to this node is captured into a digital signal processor of the node and so that source data is sent from the node to the transmission line. In a test mode, the paths in the communication IC are controlled so that data received at a second input terminal of the communication IC is output from a first output terminal. In the test mode, comparison source data from a comparison source data unit is sent to the second input terminal via a first multiplexer. An error detection unit compares the comparison source data with output data, which is output from the first output terminal of the communication IC in response to the comparison source data, to detect errors in the communication IC.

7 Claims, 7 Drawing Sheets

ROUTING IMAGE IN THE TEST MODE

ERROR DETECTION METHOD, ERROR DETECTION APPARATUS, AND NETWORK SYSTEM

BACKGROUND OF THE INVENTION

1. Field of the Invention

The present invention relates to an error detection method and an error detection apparatus for detecting errors in a communication controller in each node when a plurality of nodes on a transmission line communicate with each other, and to a network system provided with the error detection apparatuses.

2. Description of the Related Art

Conventionally, a vehicle network system has been used on a vehicle. This vehicle, network system is composed of a plurality of nodes connected, for example, in a ring form. Each node on this network sends and receives data to or from other nodes over the transmission line.

Figure 1:
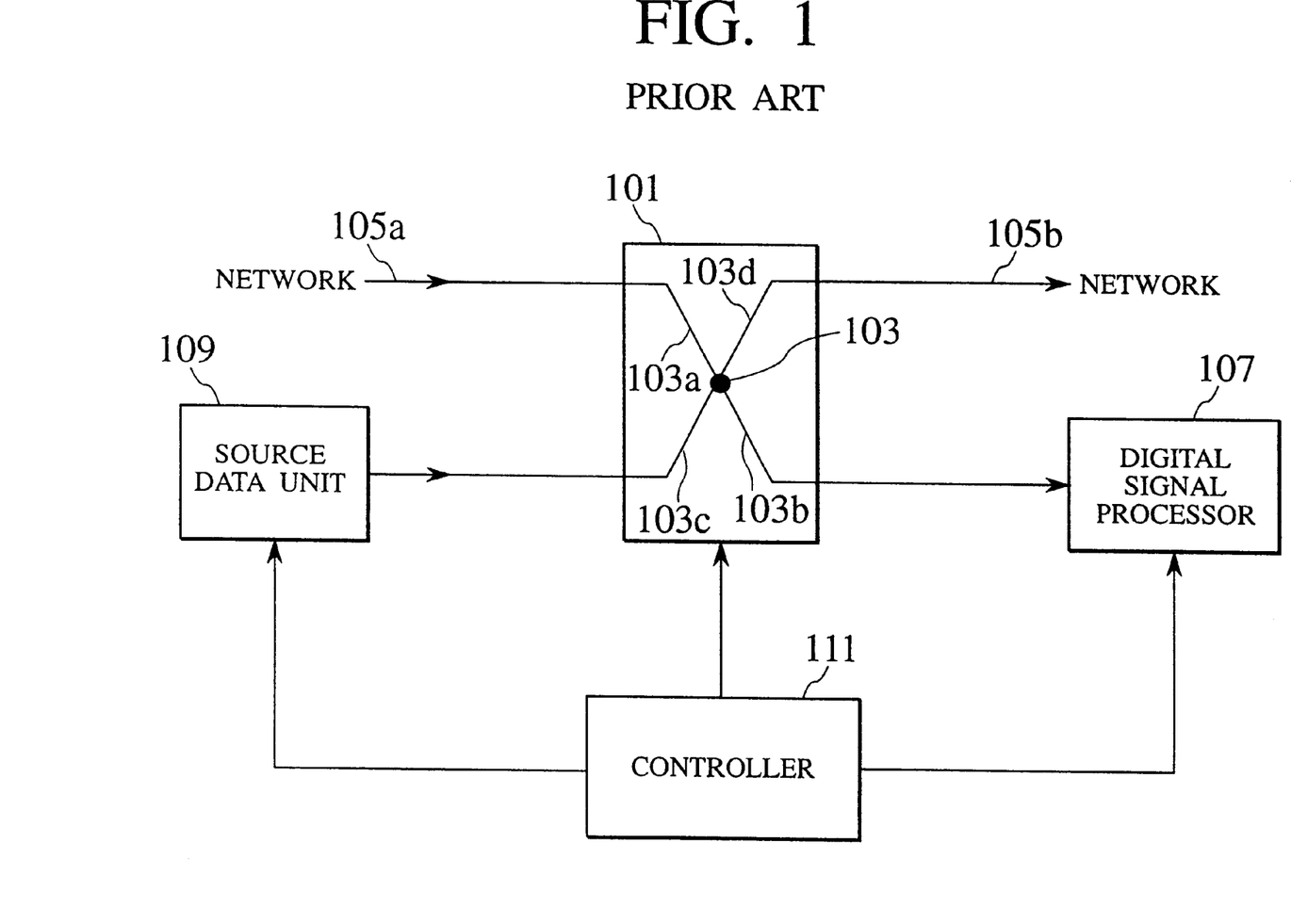
FIG. 1 is a diagram showing a communication IC provided in a conventional node and its peripheral circuits.

Each node on this vehicle network system has a communication integrated circuit (communication IC, for short) which acts as a communication controller controlling data transmission and reception. FIG. 1 is a diagram showing a communication IC, provided in a conventional node, and its peripheral circuits.

Referring to FIG. 1, each node comprises a communication IC 101, a digital signal processor 107, a source data unit 109, and a controller 111 controlling all these components.

The communication IC 101 comprises a router 103 which has the routing function. When data received from an upstream network 105a is addressed to this node, the communication IC 101 captures it into the digital signal processor 107 via paths 103a and 103b; when the data is not addressed to this node, the communication IC 101 sends it to a downstream network 105b via paths 103a and 103d.

When the source data unit 109 has data to be sent, the communication IC 101 receives the data from the source data unit 109 and sends it to the downstream network 105b via paths 103c and 103d.

Figure 2:
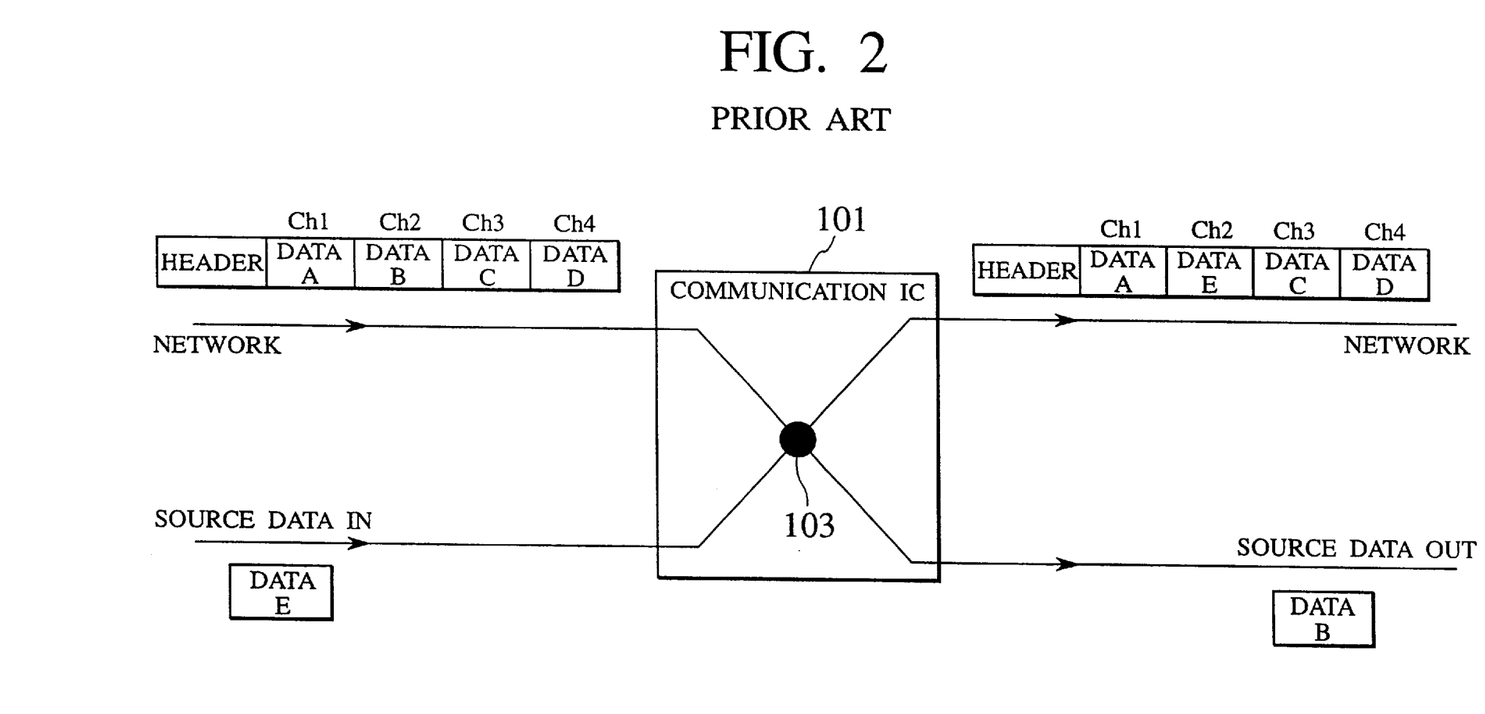
FIG. 2 is a diagram illustrating how routing is performed by a conventional communication IC.

FIG. 2 is a diagram illustrating how routing is performed by the conventional communication IC. Referring to FIG. 2, when a frame composed of a header and four data items (Ch1 data A, Ch2 data B, Ch3 data C, and Ch4 data D, all in 16 bits) is sent from the upstream network 105a, the router 103 gets desired data, which is Ch2 data B, from the frame and stores it as source data OUT.

When there is data to be sent from the node, the router 103 adds data E, which source data IN to be sent, to the Ch2 data area of the frame and sends the frame to the downstream network 105b.

However, in the conventional system, the communication IC 101 sends source data to the downstream network 105b without making a data check. This sometimes results in problems. For example, when the communication IC performing real-time transfer of digital audio data enters the routing operation error state due to an initialization error or some other errors, incorrect source data, such as out-of-synchronization data, is generated during routing operation and is sent to the network. This out-of-synchronization data prevents communication from being performed correctly.

In addition, when the communication IC receives data from the network while it is in the routing operation error state, it captures out-of-synchronization data. For example, in FIG. 2, although the communication IC should capture data composed only of 16-bit Ch2 data B, it captures incorrect data composed of part of Ch2 data B. preceded by the trailing part of Ch1 data A.

SUMMARY OF THE INVENTION

It is an object of the present invention to provide an error detection method and an error detection apparatus which increase network reliability by detecting communication IC errors and to provide a network system provided with the error detection apparatuses.

To achieve the above object, according to an aspect of the present invention, there is provided an error detection apparatus for detecting an error in a communication controller which, in a normal operation mode, receives a data frame from an upstream of a transmission line via a first input terminal, outputs data via a first output terminal if the data frame contains the data addressed to this node, and adds source data to the data frame and outputs the data frame to a downstream of the transmission line via a second output terminal if the source data to be sent to the downstream of the transmission line is received via a second input terminal and which, in a test mode activated when a control signal indicating the test mode is received, outputs data received via the second input terminal to the first output terminal, the error detection apparatus comprising: a test data unit which, in the test mode, sends test data to the second input terminal of the communication controller; and an error detection unit which, in the test mode, receives the test data output from the test data unit and output data output from the first output terminal of the communication controller and checks the communication controller for errors based on the test data and the output data.

According to the present invention, the test data unit sends test data, which is used in testing the communication controller for errors, to the second input terminal, and the error detection unit detects errors in the communication controller based on the output data output from the communication controller in response to the test data and on the test data output from the test data unit. This makes it possible to easily detect errors, such as routing operation errors, of the communication controller, thus increasing network reliability.

In a preferred embodiment of the present invention, the error detection unit determines that the communication controller is normal when the test data and the output data match and that the communication controller is abnormal when the test data and the output data do not match.

In a preferred embodiment of the present invention, the error detection apparatus further comprises: a first switching unit which connects a source data unit storing the source data therein to the second input terminal in the normal operation mode and which connects the test data unit to the second input terminal in the test mode; and a second switching unit which connects the first output terminal to a processing unit processing the data addressed to the node in the normal operation mode and which connects the first output terminal to the error detection unit in the test mode.

To achieve the above object, according to another aspect of the present invention, there is provided an error detection method for detecting an error in a communication controller which, in a normal operation mode, receives a data frame from an upstream of a transmission line via a first input terminal, outputs data via a first output terminal if the data frame contains the data addressed to this node, and adds source data to the data frame and outputs the data frame to a downstream of the transmission line via a second output terminal if the source data to be sent to the downstream of the transmission line is received via a second input terminal and which, in a test mode activated when a control signal indicating the test mode is received, outputs data received via the second input terminal to the first output terminal, the error detection method comprising the steps of: in the test mode, sending test data to the second input terminal of the communication controller; and checking the communication controller for errors based on output data output from the first output terminal of the communication controller and the test data.

In a preferred embodiment of the present invention, the communication controller is determined to be normal when the test data and the output data match and wherein the communication controller is determined to be abnormal when the test data and the output data do not match.

In a preferred embodiment of the present invention, in the normal operation mode, a source data unit storing the source data therein is connected to the second input terminal and the first output terminal is connected to a processing unit processing the data addressed to the node; and in the test mode, the test data unit is connected to the second input terminal and the first output terminal is connected to the error detection unit.

To achieve the above object, according to still another aspect of the present invention, there is provided a network system comprising a plurality of nodes connected via a transmission line in a ring form, each node comprising: a communication controller which, in a normal operation mode, receives a data frame from an upstream of the transmission line via a first input terminal, outputs data via a first output terminal if the data frame contains the data addressed to this node, and adds source data to the data frame and outputs the data frame to a downstream of the transmission line via a second output terminal if the source data to be sent to the downstream of the transmission line is received via a second input terminal and which, in a test mode activated when a control signal indicating the test mode is received, outputs data received via the second input terminal to the first output terminal; and an error detection apparatus for detecting an error in the communication controller, the error detection apparatus comprising: a test data unit which, in the test mode, sends test data to the second input terminal of the communication controller; and an error detection unit which, in the test mode, receives the test data output from the test data unit and output data output from the first output terminal of the communication controller and checks the communication controller for errors based on the test data and the output data.

According to the present invention, in the error detection apparatus provided in each node, the test data unit sends test data, which is used in testing the communication controller for errors, to the second input terminal, and the error detection unit detects errors in the communication controller based on the output data output from the communication controller in response to the test data and on the test data output from the test data unit. This makes it possible to easily detect errors, such as routing operation errors, of the communication controller, thus increasing network reliability.

The nature, principle and utility of the invention will become more apparent from the following detailed description when read in conjunction with the accompanying drawings.

DESCRIPTION OF THE PREFERRED EMBODIMENTS

Some embodiments of an error detection method, an error detection apparatus, and a network system having the error detection apparatuses thereon in accordance with the present invention will be described below with reference to the drawings.

Figure 3:
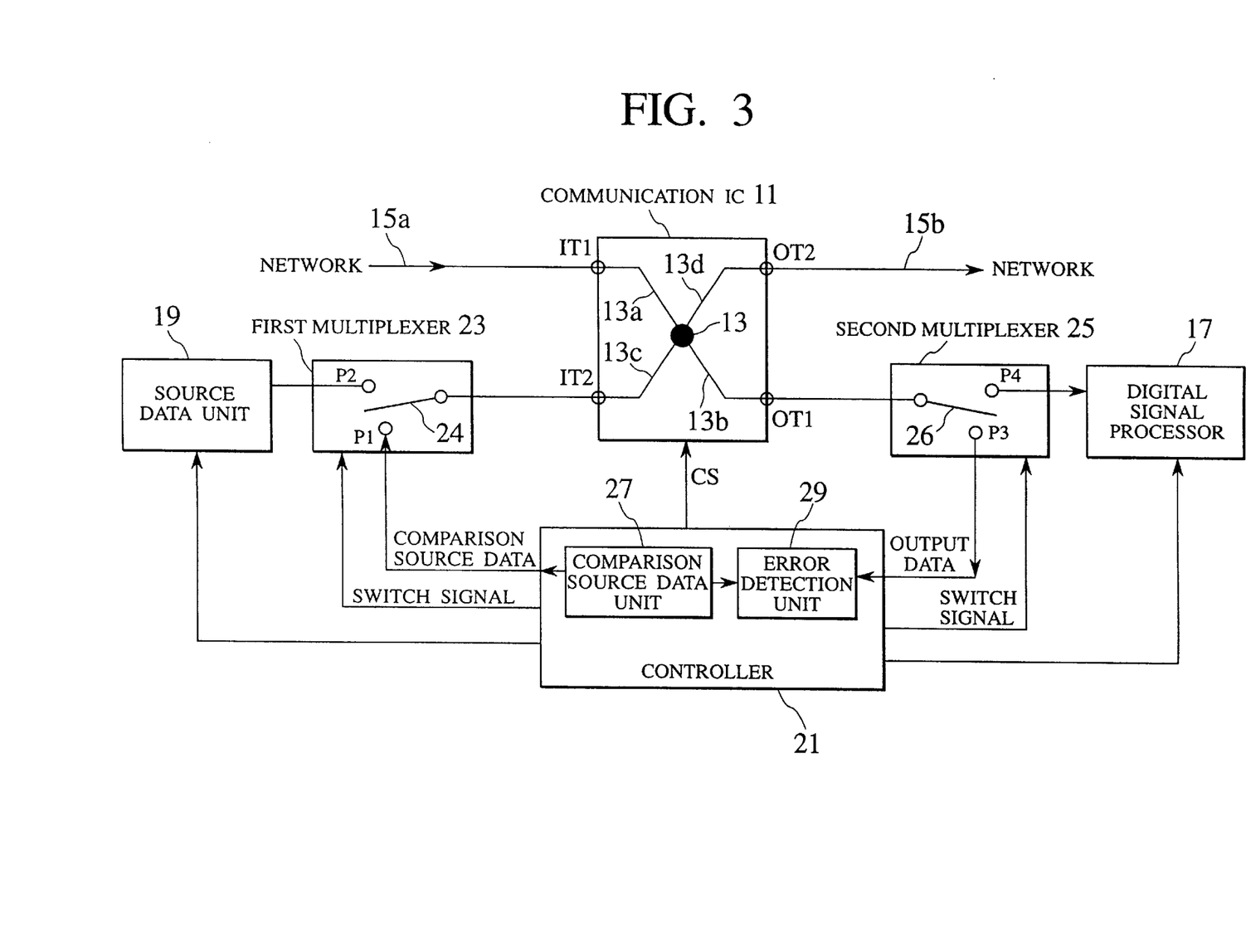
FIG. 3 is a block diagram showing the configuration of an error detection apparatus used in an embodiment according to the present invention.
Figure 4:
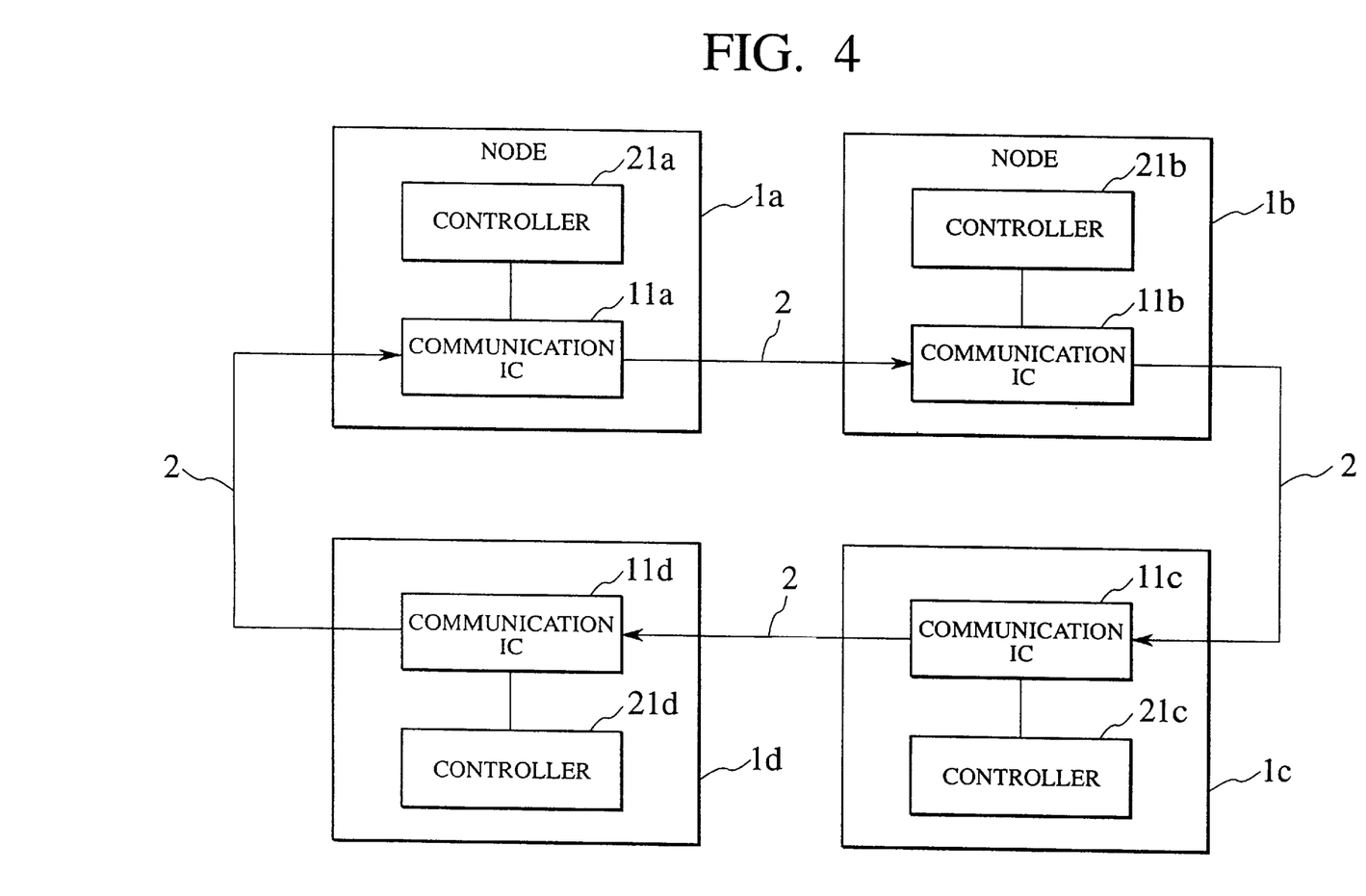
FIG. 4 is a block diagram showing the configuration of a vehicle network system including the error detection apparatuses used in the embodiment according to the present invention.

FIG. 3 is a block diagram showing the configuration of the error detection apparatus used in an embodiment according to the present invention. FIG. 4 is a block diagram showing the configuration of a vehicle network system including the error detection apparatuses used in the embodiment according to the present invention.

The error detection method, error detection apparatus, and network system used in the embodiment are applied to vehicles such as cars. In the vehicle network system shown in FIG. 4, a plurality of nodes 1a–1d are connected via a transmission line 2 in the ring form so that data and commands are sent in the arrow direction. In addition, the network is built so that the nodes can send data to, and receive data from, the transmission line 2.

Nodes 1b–1d are, for example, a compact disc (CD) player, a radio, and an amplifier. Node 11a is a controller, such as an audio controller, which controls the operation of the units such as the CD player, radio, and amplifier.

As shown in FIG. 4, nodes 1a–1d basically comprise communication ICs, 11a–11d, and controllers 21a–21d, respectively. The communication ICs, 11a–11c, function as communication controllers, and the controllers, 21a–21d, are composed of central processing units (CPUs) and other units which control the communication ICs, 11a–11d, respectively.

As shown in the detailed diagram in FIG. 3, each of nodes 1a–1d comprises a communication IC 11, a digital signal processor 17 which processes received data, a source data unit 19, a controller 21, a first multiplexer 23, and a second multiplexer 25. The controller 21, first multiplexer 23, and second multiplexer 25 constitute an error detection apparatus which detects errors.

The communication IC 11 comprises a router 13 which has the routing function. When data received from an upstream network 15a (for example, the transmission line 2 connected to the node) is addressed to this node, the communication IC 11 captures the data via a first input terminal IT1 and sends the data to the digital signal processor 17 via paths 13a and 13b and a first output terminal OT1; when the received data is not addressed to this node, the communication IC 11 sends the data to a downstream network 15b via paths 13a and 13d and a second output terminal OT2.

In addition, when the node has data to be sent, the communication IC 11 receives the data from a second input terminal IT2 and sends it to the second output terminal OT2 via the paths 13c and 13d.

A source data unit 19 stores therein source data to be sent to the downstream network 15b and outputs the data to a first multiplexer 23. The controller 21 controls the communication IC 11, source data unit 19, and digital signal processor 17. The controller 21 comprises a comparison a source data unit 27 and an error detection unit 29.

In the test mode in which the communication IC 11 is checked for errors, the controller 21 outputs a switch signal to the first multiplexer 23 and the second multiplexer 25.

In addition, in the test mode, the controller 21 outputs a control signal CS to the communication IC 11 to control the router 13 so that comparison source data received by the communication IC 11 is output to the second multiplexer 25 via the paths 13c and 13b and the first output terminal OT1.

The first multiplexer 23 comprises a source data input port P2, a comparison source data input port P1, and a contact segment 24. In the normal operation mode, the first multiplexer 23 connects the source data unit 19 to the second input terminal IT2 via the source data input port P2. In the test mode, the first multiplexer 23 switches the contact segment 24 from the source data input port P2 to the comparison source data input port P1 in response to the switch signal from the controller 21 to connect the comparison source data unit 27 to the second input terminal IT2.

The second multiplexer 25 comprises a source data output port P4, a comparison source data output port P3, and a contact segment 26. In the normal operation mode, the second multiplexer 25 connects the first output terminal OT1 to the digital signal processor 17 via the source data output port P4. In the test mode, the second multiplexer 25 switches the contact segment 24 from the source data output port P4 to the comparison source data output port P3 in response to the switch signal from the controller 21 to connect the first output terminal OT1 to the error detection unit 29.

The comparison source data unit 27 is, for example, a storage unit which stores therein comparison source data (for example, comparison source data composed all of '1's) that is used as test data for checking if the communication IC 11 is operating normally. This comparison source data is sent to the communication IC 11 via the comparison source data input port P1 and the second input terminal IT2.

Upon receiving the comparison source data from the second input terminal IT2, the communication IC 11 outputs the data, with the use of the routing function, to the first output terminal OT1 via the paths 13c and 13b and then to the comparison source data output port P3 of the second multiplexer 25 as output data.

The error detection unit 29 receives the output data from the comparison source data output port P3 and, at the same time, receives the comparison source data from the comparison source data unit 27. The error detection unit 29 checks if the comparison source data and the output data match. When the comparison source data and the output data match, the error detection unit 29 determines that the communication IC 11 is normal; when they do not match, the error detection unit 29 determines that the communication IC 11 is abnormal.

Figure 5:
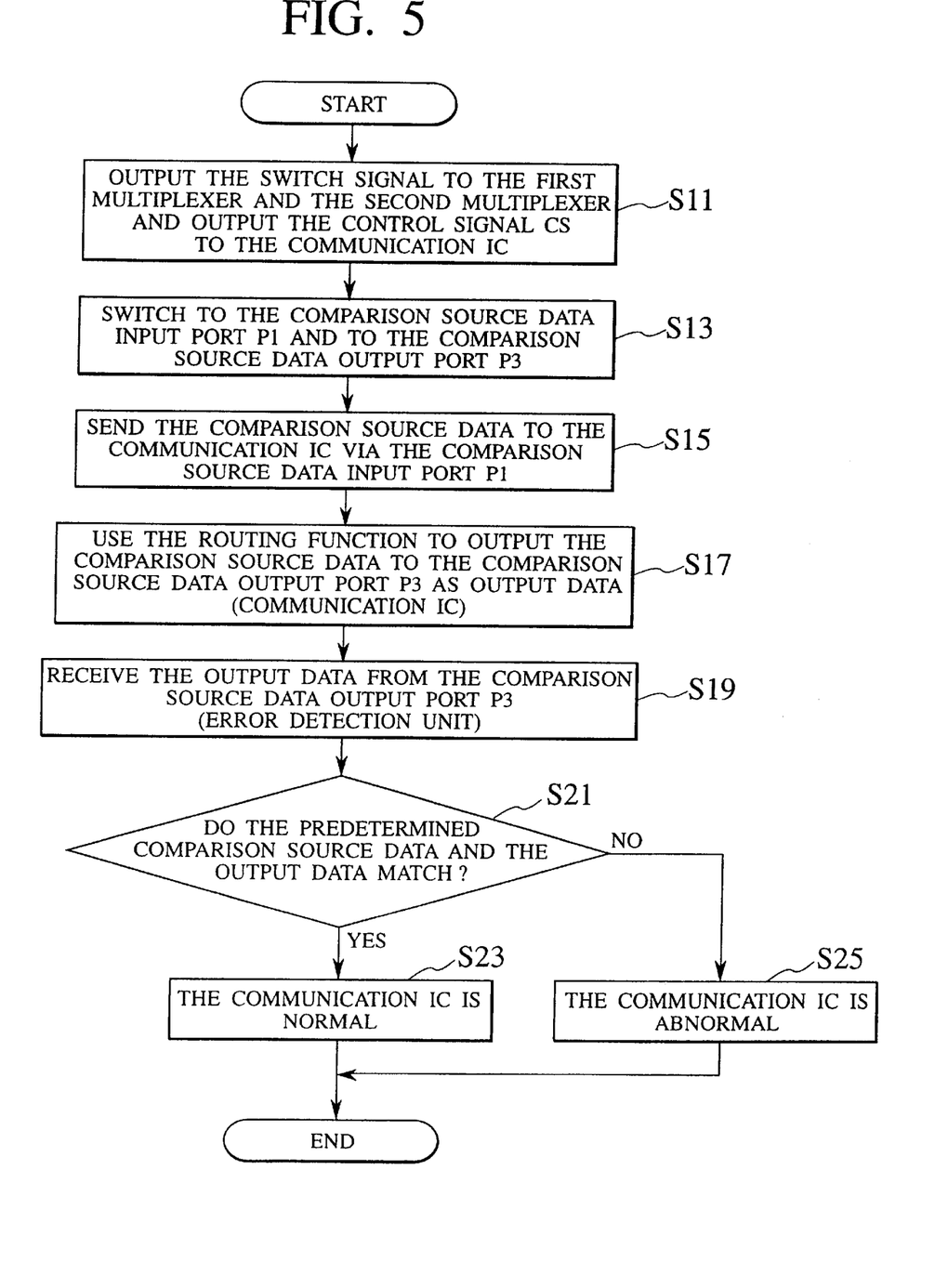
FIG. 5 is a flowchart showing the operation of the error detection apparatus used in the embodiment.

FIG.5 is a flowchart showing the operation of the error detection apparatus used in the embodiment. Referring to FIG.5, the operation of the error detection apparatus, that is, the error detection method, will be described.

After the node is turned on and initialized, it is switched from the normal operation mode to the test mode regularly.

To switch the mode to the test mode in which the communication IC 11 is checked for errors, the controller 21 outputs the switch signal to the first multiplexer 23 and the second multiplexer 25 and outputs the control signal CS to the communication IC 11 (step S11).

In response to the switch signal from the controller 21, the first multiplexer 23 switches the contact segment 24 from the source data input port P2 to the comparison source data input port P1.

At the same time, in response to the switch signal from the controller 21, the second multiplexer 25 switches the contact segment 26 from the source data output port P4 to the comparison source data output port P3 (step S13).

Next, the comparison source data unit 27 sends the comparison source data to the communication IC 11 via the comparison source data input port P1 of the first multiplexer 23 and the second input terminal IT2 (step S15).

The communication IC 11 receives the comparison source data from the second input terminal IT2 and, with the use of the routing function activated by the control signal CS, outputs it to the first output terminal OT1 via the paths 13c and 13b and then to the comparison source data output port P3 of the second multiplexer 25 as output data (step S17).

The error detection unit 29 receives the output data from the comparison source data output port P3 (step S19). The error detection unit 29 receives the comparison source data from the comparison source data unit 27 and checks if the comparison source data and the output data from the comparison source data output port P3 match(step S21).

When the comparison source data and the output data match, the error detection unit 29 determines that the communication IC 11 is normal (step S23).

On the other hand, when the comparison source data and the output data do not match, for example, when the comparison source data is 8-bit data with the value of '11111111' and the output data is 8-bit data with the value of '01111111', the error detection unit 29 determines that the communication IC 11 is abnormal (step S25).

Figure 6:
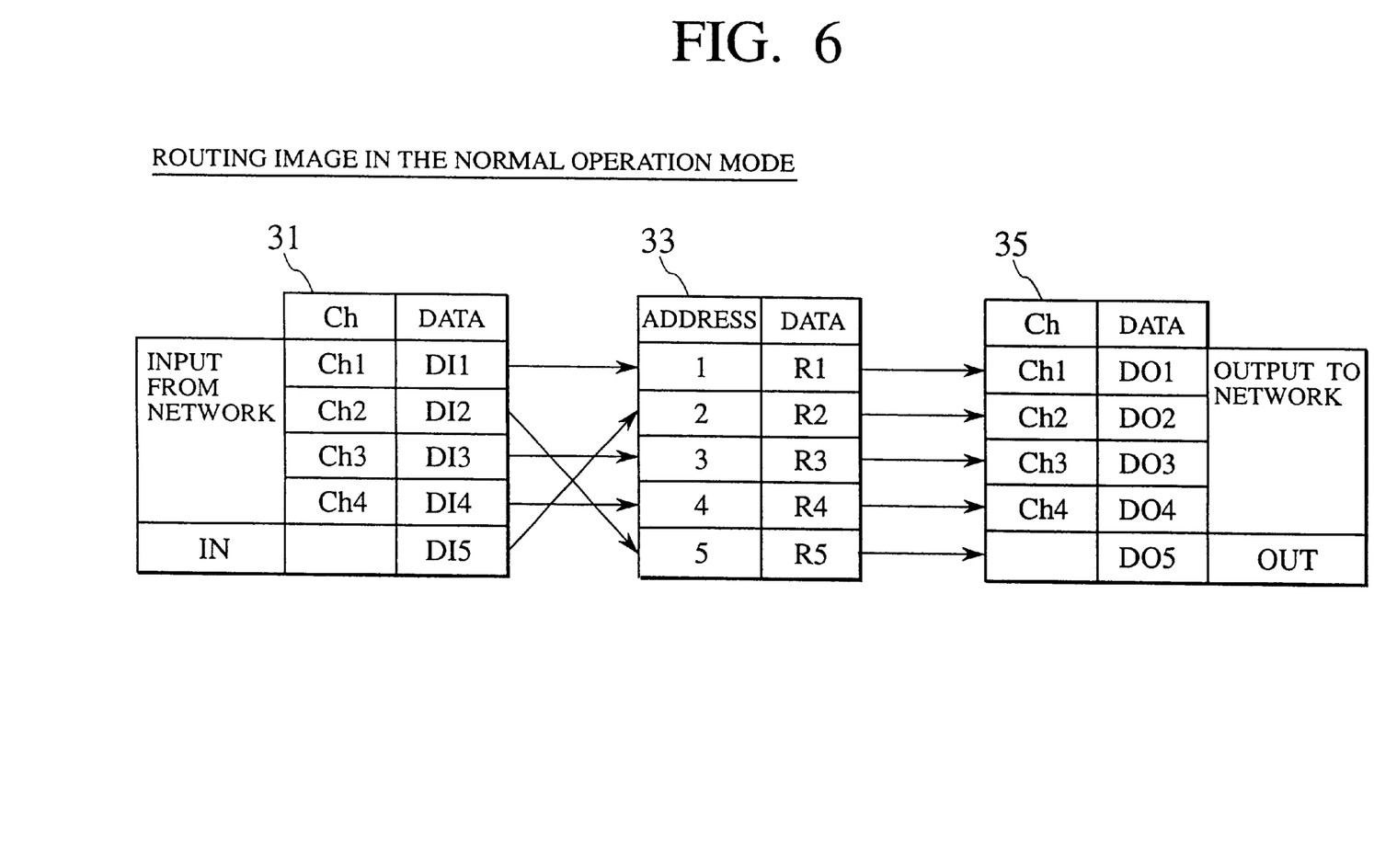
FIG. 6 is a diagram showing the routing image of the communication IC during normal operation.

Next, the following describes the routing image of the communication IC 11 in the normal operation mode. FIG.6 shows the routing image of the communication IC in the normal operation mode. In FIG.6, an input unit 31 of the communication IC 11 receives from the upstream network 15a a frame composed of Ch1 input data DI1, Ch2 input data DI2, Ch3 input data DI3, and Ch4 input data DI4. The input unit 31 also receives input data IN from the source data unit 19 as data to be sent to the network.

A routing table 33 has address data entries R1, R2, R3, R4, and R5. It allocates the input data DI1 to address R1, input data DI2 to address R5, input data DI3 to address R3, input data DI4 to address R4, and input data DI5 to address R2.

An output unit 35 forms a frame according to the routing table 33 and outputs it to the downstream network. This frame is composed of Ch1 output data DO1 which is the input data DI1 stored at address R1, Ch2 output data DO2 which is the input data DI5 stored at address R2, Ch3 output data DO3 which is the input data DI3 stored at address R3, and Ch4 output data DO4 which is the input data DI4 stored at address R4. At the same time, the output unit 35 outputs output data DO5, which is the input data DI2 stored at address R5, to the digital signal processor 17.

In this case, the routing table 33 allows the Ch2 input data DI2 to be captured as the output data DO5 and, at the same time, the input data DI5 from the source data unit 19 to be sent to the downstream network as the Ch2 output data DO2. That is, the routing image of the communication IC in the normal operation time, shown in FIG. 6, corresponds to the operation shown in FIG. 2.

Figure 7:
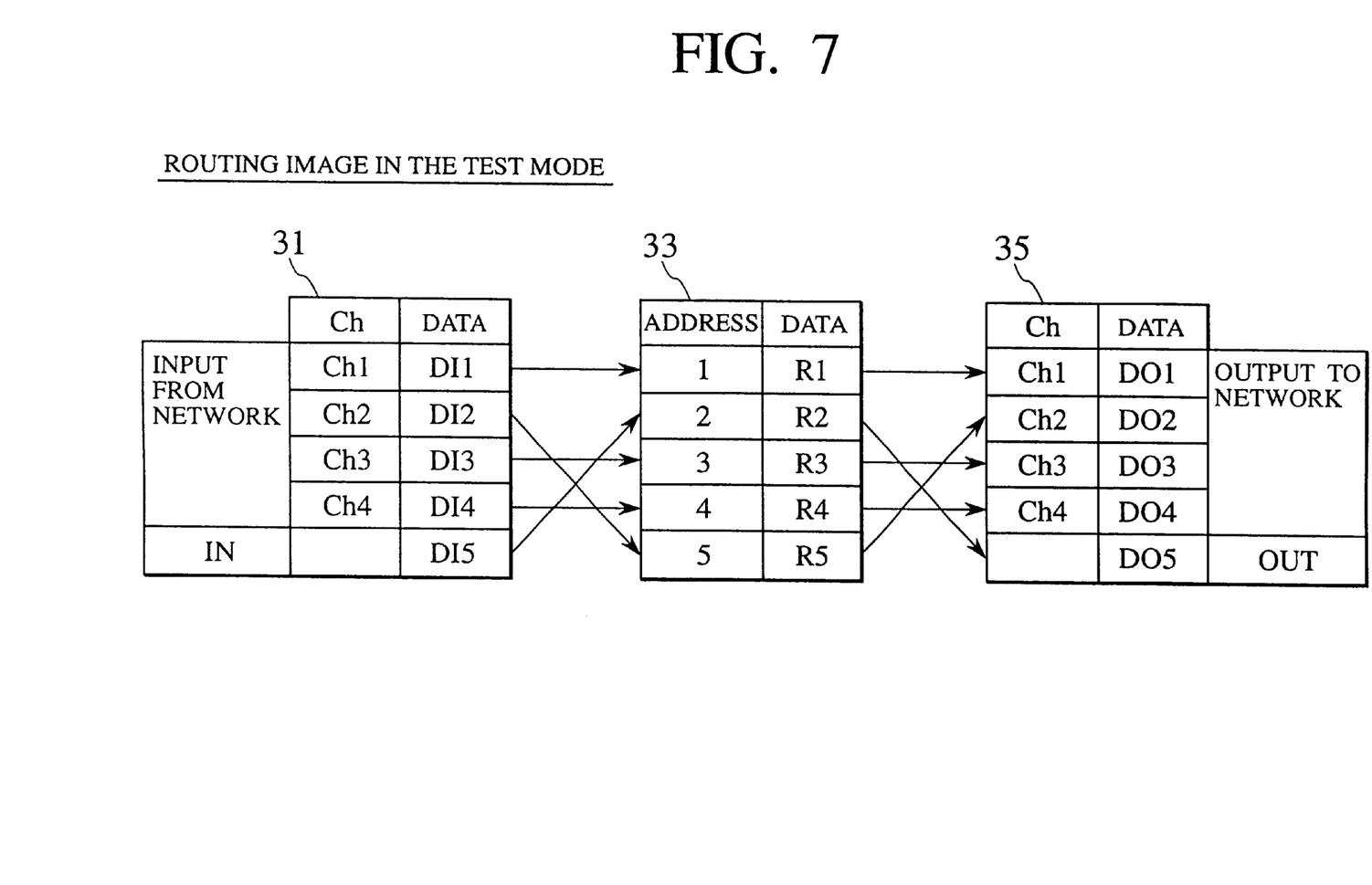
FIG. 7 is a diagram showing the routing image of the communication IC during test mode operation.

FIG. 7 shows the routing image of the communication IC in the test mode. In FIG. 7, the input unit 31 of the communication IC 11 receives from the upstream network 15a a frame composed of Ch1 input data DI1, Ch2 input data DI2, Ch3 input data DI3, and Ch4 input data DI4. The input unit 31 also receives input data IN from the source data unit 19 as data to be sent to the network.

The routing table 33 allocates the input data DI1 to address R1, input data DI2 to address R5, input data DI3 to address R3, input data DI4 to address R4, and input data DI5 to address R2.

The output unit 35 forms a frame and outputs it to the downstream network. This frame is composed of Ch1 output data DO1 which is the input data DI1 stored at address R1, Ch2 output data DO2 which is the input data DI2 stored at address R5, Ch3 output data DO3 which is the input data DI3 stored at address R3, and Ch4 output data DO4 which is the input data DI4 stored at address R4. At the same time, the output unit 35 outputs output data DO5, which is the input data DI5 stored at address R2, to the error detection unit 29.

In this case, the routing table 33 allows the Ch1–Ch4 input data DI1–DI4 to be directly output to the downstream network as Ch1–Ch4 output data DO1–DO4 and, at the same time, the input data DI5 to be output to the error detection unit 29 as the output data DO5. This makes it possible to check for errors of the communication IC 11.

As described above, the comparison source data unit 27 of the error detection apparatus used in this embodiment sends, in the test mode, comparison source data for testing the communication IC 11 to the second input terminal IT2 of the communication IC 11 via the first multiplexer 23. Upon receiving this comparison source data at the second input terminal IT2, the communication IC 11 outputs it from the first output terminal OT1 as output data. The error detection unit 29 can therefore compare the output data with the comparison source data, generated by the comparison source data unit 27, to check for errors of the communication IC 11.

Thus, the error detection apparatus can detect errors, such as routing errors, in the communication IC 11, increasing the network reliability. In addition, because the error detection apparatus is provided in each node for detecting errors in the communication IC 11, it further increases the network reliability.

It is to be understood that the present invention is not limited to the vehicle network system described above. In the embodiment, the error detection unit 29 compares output data with comparison source data to detect errors in the communication IC 11. Instead of this comparison, another error detection method may be used. For example, when the comparison source data is composed of all '1's, errors in the communication IC 11 may be detected, for example, with the use of a counter, by checking to see if the comparison source data contains '0'.

The present invention may be applied not only to a wide area network system but also to a local area network (LAN)system.

More generally, it should be understood that many modifications and adaptations of the invention will become apparent to those skilled in the art and it is intended to encompass such obvious modifications and changes in the scope of the claims appended hereto.

What is claimed is:

1. An error detection apparatus for detecting an error in a communication controller which, in a normal operation mode, receives a data frame from an upstream of a transmission line via a first input terminal, outputs data via a first output terminal if the data frame contains the data addressed to this node, and adds source data to said data frame and outputs the data frame to a downstream of the transmission line via a second output terminal if the source data to be sent to the downstream of the transmission line is received via a second input terminal and which, in a test mode activated when a control signal indicating the test mode is received, outputs data received via the second input terminal to the first output terminal, said error detection apparatus comprising:

a test data unit which, in said test mode, sends test data to said second input terminal of said communication controller; and an error detection unit which, in said test mode, receives said test data output from said test data unit and output data output from said first output terminal of said communication controller and checks said communication controller for errors based on said test data and said output data.

2. The error detection apparatus according to claim 1 wherein said error detection unit determines that said communication controller is normal when said test data and said output data match and that said communication controller is abnormal when said test data and said output data do not match.

3. The error detection apparatus according to claim 1, further comprising:

a first switching unit which connects a source data unit storing said source data therein to said second input terminal in said normal operation mode and which connects said test data unit to said second input terminal in said test mode; and a second switching unit which connects said first output terminal to a processing unit processing the data addressed to the node in said normal operation mode and which connects said first output terminal to said error detection unit in said test mode.

4. An error detection method for detecting an error in a communication controller which, in a normal operation mode, receives a data frame from an upstream of a transmission line via a first input terminal, outputs data via a first output terminal if the data frame contains the data addressed to this node, and adds source data to said data frame and outputs the data frame to a downstream of the transmission line via a second output terminal if the source data to be sent to the downstream of the transmission line is received via a second input terminal and which, in a test mode activated when a control signal indicating the test mode is received, outputs data received via the second input terminal to the first output terminal, said error detection method comprising the steps of:

in said test mode, sending test data to said second input terminal of said communication controller; and checking said communication controller for errors based on output data output from said first output terminal of said communication controller and said test data.

5. The error detection method according to claim 4 wherein said communication controller is determined to be normal when said test data and said output data match and wherein said communication controller is determined to be abnormal when said test data and said output data do not match.

6. The error detection method according to claim 4, further comprising the steps of:
   in said normal operation mode, connecting a source data unit storing said source data therein to said second input terminal and connecting said first output terminal to a processing unit processing the data addressed to the node; and
   in said test mode, connecting said test data unit to said second input terminal and connecting said first output terminal to said error detection unit.

7. A network system comprising a plurality of nodes connected via a transmission line in a ring form, each node comprising:
   a communication controller which, in a normal operation mode, receives a data frame from an upstream of the transmission line via a first input terminal, outputs data via a first output terminal if the data frame contains the data addressed to this node, and adds source data to said data frame and outputs the data frame to a downstream of the transmission line via a second output terminal if the source data to be sent to the downstream of the transmission line is received via a second input terminal and which, in a test mode activated when a control signal indicating the test mode is received, outputs data received via the second input terminal to the first output terminal; and
   an error detection apparatus for detecting an error in the communication controller,
   said error detection apparatus comprising:
      a test data unit which, in said test mode, sends test data to said second input terminal of said communication controller; and
      an error detection unit which, in said test mode, receives said test data output from said test data unit and output data output from said first output terminal of said communication controller and checks said communication controller for errors based on said test data and said output data.

* * * * *

UNITED STATES PATENT AND TRADEMARK OFFICE
CERTIFICATE OF CORRECTION

PATENT NO.     : 6,381,714 B1
DATED          : April 30, 2002
INVENTOR(S)    : Akiyoshi Tomita et al.

It is certified that error appears in the above-identified patent and that said Letters Patent is hereby corrected as shown below:

Column 4,
Line 38, change "[11a]" to read -- 1a --.

Signed and Sealed this

First Day of October, 2002

Attest:

Attesting Officer

JAMES E. ROGAN
Director of the United States Patent and Trademark Office